(12) United States Patent
Kim et al.

(10) Patent No.: US 12,083,861 B2
(45) Date of Patent: Sep. 10, 2024

(54) HEAT PUMP SYSTEM FOR VEHICLE

(71) Applicants: Hyundai Motor Company, Seoul (KR); Kia Corporation, Seoul (KR)

(72) Inventors: Yeonho Kim, Seoul (KR); Wan Je Cho, Hwaseong-si (KR); Won Seok Sung, Seoul (KR); Jeawan Kim, Hwaseong-si (KR); Jae Yeon Kim, Hwaseong-si (KR); Seong-Bin Jeong, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 125 days.

(21) Appl. No.: 17/710,291

(22) Filed: Mar. 31, 2022

(65) Prior Publication Data

US 2023/0063915 A1    Mar. 2, 2023

(30) Foreign Application Priority Data

Aug. 25, 2021    (KR) .......................... 10-2021-0112273

(51) Int. Cl.
*B60H 1/00*    (2006.01)
(52) U.S. Cl.
CPC ................. *B60H 1/00921* (2013.01)
(58) Field of Classification Search
CPC .... B60H 2001/003; B60H 2001/00307; B60H 2001/00928; B60H 2001/00961; B60H 2001/00946; B60H 1/00278; B60H 1/00921; B60H 1/143; B60H 1/00385; B60H 1/00885; B60H 1/32281
See application file for complete search history.

(56) References Cited

U.S. PATENT DOCUMENTS

| | | | | |
|---|---|---|---|---|
| 2012/0291478 | A1* | 11/2012 | Kim | ........................ F25B 39/04 62/507 |
| 2017/0361677 | A1* | 12/2017 | Kim | .................... H01M 10/663 |
| 2020/0338950 | A1* | 10/2020 | Kim | ................... B60H 1/00921 |
| 2021/0300146 | A1* | 9/2021 | Ishizeki | ............... B60H 1/3205 |

FOREIGN PATENT DOCUMENTS

KR    10-2020-0123952 A    11/2020

* cited by examiner

*Primary Examiner* — Jianying C Atkisson
*Assistant Examiner* — Meraj A Shaikh
(74) *Attorney, Agent, or Firm* — MORGAN, LEWIS & BOCKIUS LLP

(57) ABSTRACT

A heat pump system for a vehicle includes: a cooling apparatus that includes a coolant line, and circulates a coolant in the coolant line; and an air conditioning device that circulates a refrigerant along a refrigerant line to control an indoor temperature of the vehicle, wherein the air conditioning device may include first and second heat exchangers connected through the refrigerant line, and in a heating mode of the vehicle, the first heat exchanger and the second heat exchanger may be supplied with a refrigerant separated into the refrigerant line and a first branch line after being expanded, or a refrigerant expanded after being separated into the refrigerant line and the first branch line.

14 Claims, 4 Drawing Sheets

HEAT PUMP SYSTEM FOR VEHICLE

CROSS-REFERENCE TO RELATED APPLICATION

The present application claims priority to Korean Patent Application No. 10-2021-0112273 filed on Aug. 25, 2021, the entire contents of which is incorporated herein for all purposes by this reference.

BACKGROUND OF THE PRESENT DISCLOSURE

Field of the Present Disclosure

The present disclosure relates to a heat pump system for a vehicle. More particularly, the present disclosure relates to a heat pump system for a vehicle that improves heating efficiency by simultaneously recovering and using heat from each heat source from two heat exchangers in the heating mode of a vehicle.

Description of Related Art

In general, an air conditioning system for a vehicle includes an air conditioning device that circulates a refrigerant to heat or cool the interior of the vehicle.

The air conditioning device maintains a comfortable indoor environment by maintaining the vehicle's indoor temperature at an appropriate temperature regardless of external temperature changes, and is configured to heat or cool the interior of the vehicle by heat-exchange by an evaporator while a refrigerant discharged by operation of a compressor circulates back to the compressor through a condenser, a receiver dryer, an expansion valve, and the evaporator.

That is, in the summer cooling mode, the air conditioning device decreases the indoor temperature and humidity through evaporation in the evaporator through the receiver dryer and expansion valve after a high temperature and high pressure gas refrigerant compressed by the compressor is condensed through the condenser.

Meanwhile, as interest in energy efficiency and environmental pollution issues is growing day by day, development of an environment-friendly vehicle that can substantially replace an internal combustion engine vehicle is required, and such an environment-friendly vehicle is usually classified into an electric vehicle driven by a fuel cell or electricity as a power source, or a hybrid vehicle driven by an engine and a battery.

Among these environment-friendly vehicles, unlike the air conditioners of general vehicles, a separate heater is not used in electric vehicles or hybrid vehicles, and the air conditioner applied to an environment-friendly vehicle is usually referred to as a heat pump system.

Meanwhile, in the case of an electric vehicle, driving torque is generated by converting the chemical reaction energy of oxygen and hydrogen into electrical energy, and during the present process, heat energy is generated by a chemical reaction in the fuel cell, and accordingly, effective removal of the generated heat is essential for securing performance of the fuel cell.

Furthermore, in hybrid vehicles, along with the engine operated by a general fuel, driving torque is generated by driving a motor using electricity supplied from the fuel cell or an electric battery, and thus the performance of the motor may be secured only by effectively removing the heat generated from the fuel cell, battery, and motor.

Accordingly, in a hybrid vehicle or electric vehicle according to the related art, a cooling means, a heat pump system, and a battery cooling system may be formed of an individual closed circuit to thereby prevent heat generation of a battery and a motor, an electrical component, and a fuel cell.

Therefore, the size and weight of a cooling module disposed in the front of the vehicle increase, and the layout of connection pipes that supply a refrigerant or coolant to each of the heat pump system, the cooling means, and the battery cooling system inside the engine compartment becomes complicated.

Furthermore, in the vehicle's heating mode, it is difficult to simultaneously recover waste heat from an external heat source and a heating element including an electrical component and a battery module, deteriorating the performance of the heat pump system.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle heat pump system that can improve heating efficiency by recovering and using each heat source together from two heat-exchangers that heat-exchange a refrigerator in a heating mode of the vehicle.

A heat pump system for a vehicle according to various exemplary embodiments of the present disclosure includes: a cooling apparatus that includes a coolant line, and circulates a coolant in the coolant line; and an air conditioning device that circulates a refrigerant along a refrigerant line to control an indoor temperature of the vehicle, wherein the air conditioning device may include first and second heat exchangers connected through the refrigerant line, and in a heating mode of the vehicle, the first heat exchanger and the second heat exchanger may be supplied with a refrigerant separated into the refrigerant line and a first branch line after being expanded, or a refrigerant expanded after being separated into the refrigerant line and the first branch line.

A first end portion of the first branch line may be connected to the refrigerant line at a front end portion of the first heat exchanger based on a flow direction of the refrigerant, and the second end portion of the first branch line may be connected to the refrigerant line between the first heat exchanger and the second heat exchanger.

The first branch line may be provided with a first refrigerant valve.

The air conditioning device may include: an evaporator which is connected to the second heat exchanger through the refrigerant line; a compressor which is connected to the evaporator through the refrigerant line; an internal condenser which is connected to the compressor through the refrigerant line; a first expansion valve which is provided in the refrigerant line between the second heat exchanger and the evaporator; a second branch line that selectively connects the first heat exchanger and an accumulator through a second refrigerant valve for selective inflow of a refrigerant passed through the first heat exchanger to the compressor after passing through an accumulator; and a third branch line that selectively connects the second heat exchanger and the accumulator for selective inflow of the refrigerant that has passed through the second heat exchanger to the compressor after passing through the accumulator.

The second refrigerant valve may be provided in the refrigerant line between a rear end portion of the first heat exchanger and the second end portion of the first branch line.

A first end portion of the third branch line may be connected to the refrigerant line between the second heat exchanger and the first expansion valve, and a second end portion of the third branch line may be connected to the refrigerant line between the evaporator and the accumulator.

The third branch line may be provided with a third refrigerant valve.

The refrigerant line may be provided with a second expansion valve between the internal condenser and the first branch line.

When the vehicle is in a heating mode, the first branch line and the third branch line may be opened, the second branch line may be closed by operation of the second refrigerant valve, a portion of the refrigerant line connected to the evaporator may be closed by operation of the first expansion valve, and a refrigerant passed through the internal condenser may be inflowed to the first heat exchanger and the second heat exchanger respectively through the refrigerant line and the opened first branch line while being expanded by operation of the second expansion valve.

The first heat exchanger and the second heat exchanger may recover heat from a heat source while evaporating the inflowed refrigerant.

The refrigerant line may be provided with a second expansion valve between the first end portion of the first branch line and the first heat exchanger.

The first branch line may be provided with a third expansion valve.

When the vehicle is in a heating mode, the first branch line and the third branch line may be opened, the second branch line may be closed by operation of the second refrigerant valve, a portion of the refrigerant line, connected to the evaporator, may be closed by operation of the first expansion valve, some of the refrigerant passed through the internal condenser may be inflowed to the first heat exchanger while being expanded while passing through the second expansion valve along the refrigerant line, and the remaining refrigerant among the refrigerant passed through the internal condenser may be inflowed to the second heat exchanger while being expanded while passing through the third expansion valve along the first branch line.

The first heat exchanger and the second heat exchanger may recover heat from a heat source while evaporating the inflowed refrigerant, respectively.

The air conditioning device may further include a third heat exchanger provided in the refrigerant line between the first expansion valve and the third branch line.

The third heat exchanger may be connected to the refrigerant line that connects the second heat exchanger and the first expansion valve, and the refrigerant line that connects the evaporator and the accumulator.

The third heat exchanger may be a double tube heat exchanger.

The first heat exchanger may be connected to the cooling apparatus through the coolant line for heat-exchange of the refrigerant with a coolant.

The first heat exchanger may be a water-cooled heat exchanger that condenses or evaporates the refrigerant through heat-exchange with a coolant inflowed through the coolant line.

The second heat exchanger may be an air-cooled heat exchanger that condenses or evaporates the refrigerant through heat-exchange with outside air.

As described, according to the vehicle heat pump system according to the exemplary embodiment of the present disclosure, in the vehicle's heating mode, each heat source is recovered from the two heat-exchangers that heat-exchange a refrigerator, and heating efficiency may be improved by increasing the amount of heat absorbed.

Furthermore, according to an exemplary embodiment of the present disclosure, the cooling apparatus and the air conditioning device are interlocked by applying one heat exchanger and in which the coolant and refrigerant are heat-exchanged and the other heat exchanger in which the outside air and refrigerant are heat-exchanged, and thus the refrigerant is selectively condensed or evaporated, improving performance, and promoting simplification of the entire system.

Furthermore, it is possible to reduce manufacturing cost and weight, and improve space utilization through the simplification of the entire system.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
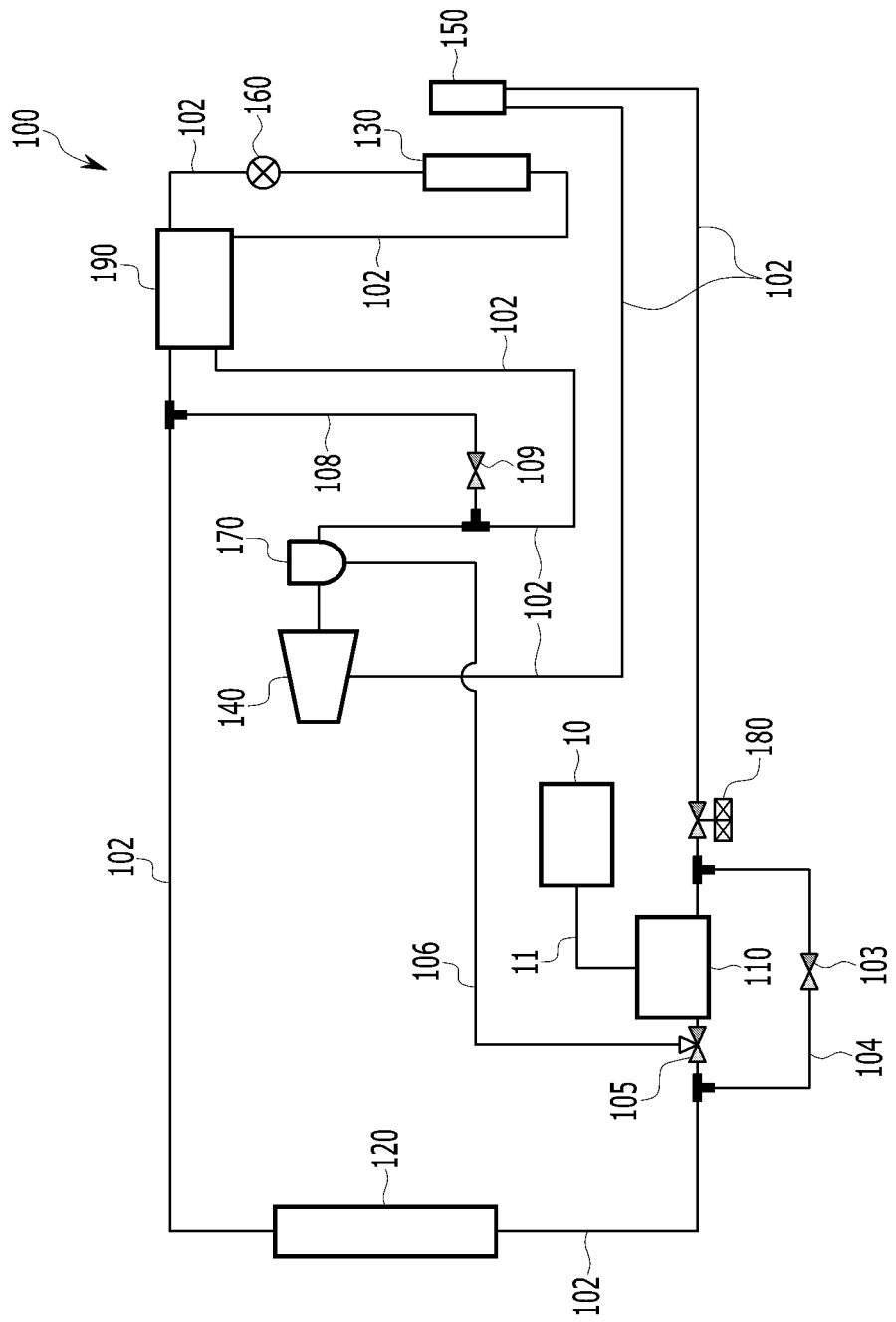
FIG. 1 is a block diagram of a heat pump system for a vehicle according to various exemplary embodiments of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Various exemplary embodiments of the present disclosure will hereinafter be described in detail with reference to the accompanying drawings.

The configuration shown in the exemplary embodiment and drawing described in the exemplary embodiment of the present disclosure is only the most exemplary embodiment of the present disclosure and does not represent all the technical ideas of the present disclosure, and accordingly, there may be various equivalents and variation examples which may be substituted for them at the time of filing the present application.

The drawings and description are to be regarded as illustrative in nature and not restrictive. Like reference numerals designate like elements throughout the specification.

Because the size and thickness of each component shown in the drawings are arbitrarily indicated for convenience of explanation, the present disclosure is not necessarily limited to the drawings, and the thicknesses are enlarged to clearly express various portions and areas.

Furthermore, unless explicitly described to the contrary, the word "comprise", and variations such as "comprises" or "comprising", will be understood to imply the inclusion of stated elements but not the exclusion of any other elements.

Furthermore, terms such as " . . . unit", " . . . means", " . . . part", and " . . . member" described in the specification refer to a unit with a comprehensive configuration that performs at least one function or operation.

FIG. 1 is a block diagram of a heat pump system for a vehicle according to various exemplary embodiments of the present disclosure.

A vehicle heat pump system according to various exemplary embodiments of the present disclosure recovers and utilizes heat from a waste heat source of a heating element and an outside air heat source together from two heat exchangers that heat-exchange a refrigerant in a heating mode of a vehicle, improving heating efficiency.

Such a heat pump system may be applied to an electric vehicle.

Referring to FIG. 1, the heat pump system may include a cooling apparatus 10 and an air conditioning device 100.

The cooling apparatus 10 may include a radiator, a water pump, and a heating element, which are not illustrated in the drawing, connected through a coolant line 11.

The radiator is disposed at the front of the vehicle, and a cooling fan is disposed behind the radiator, so that the coolant is cooled through an operation of the cooling fan and heat exchange with the outside air.

Furthermore, the heating element may include an electric power control unit (EPCU), a motor, an inverter, an on-board charger (OBC), an autonomous driving controller, or a battery module, or an oil cooler connected to the motor.

Such a heating element is provided in the coolant line 11 and may be cooled by water cooling.

The cooling apparatus with the above-described configuration may circulate a coolant in the coolant line 11 through operation of the water pump so that the coolant is supplied to the heating element provided in the coolant line 11.

Accordingly, when waste heat of the heating element is recovered in the vehicle's heating mode, heat generated from the power control apparatus, motor, inverter, charger, battery module, or autonomous driving controller may be recovered.

In the various exemplary embodiments of the present disclosure, the air conditioning device 100 may circulate a refrigerant along a refrigerant line 102 to adjust an indoor temperature of the vehicle.

Such an air conditioning device 100 may include a first heat exchanger 110 and a second heat exchanger 120 connected through the refrigerant line 102.

The first and second heat exchangers 110 and 120 may be supplied with refrigerants that are expanded in the heating mode of the vehicle and then separated respectively to the refrigerant line 102 and a first branch line 104.

Here, the air conditioning device 100 may include a heating, ventilation, and air conditioning (HVAC) module, the first heat exchanger 110, the second heat exchanger 120, an evaporator 130, a compressor 140, an internal condenser 150, a first expansion valve 160, and an accumulator 170, which are connected through the refrigerant line 102.

The non-illustrated HVAC module is connected through the refrigerant line 102, and is provided with an opening/closing door that controls outside air passing through the evaporator 130 to selectively inflow to the internal condenser 150 in accordance with a cooling mode, a heating mode, and a heating and dehumidification mode of the vehicle.

That is, the evaporator 130 and the internal condenser 150 may be provided inside the non-illustrated HVAC module.

Here, the opening/closing door is opened so that outside air that has passed through the evaporator 130 in the vehicle's heating mode inflows to the internal condenser 150. On the other hand, in the vehicle's cooling mode, the opening/closing door closes the internal condenser 150 side so that the cooled outside air flows directly into the vehicle while passing through the evaporator 130.

In an exemplary embodiment of the present disclosure, the first heat exchanger 110 is connected to the refrigerant line 102 and a refrigerant passes therethrough.

Here, the first heat exchanger 110 may be connected to the cooling apparatus 10 through the coolant line 11 to heat-exchange the refrigerant with a coolant.

According to a mode of the vehicle, the first heat exchanger 110 may condense or evaporate the refrigerant through heat-exchange with the coolant inflowed through the coolant line 11.

That is, the first heat exchanger 110 condenses the refrigerant in the vehicle's cooling mode and evaporates the refrigerant in the vehicle's heating mode. Such a first heat exchanger 110 may be a water-cooled heat exchanger in which a coolant is inflowed.

The second heat exchanger 120 is connected through the first heat exchanger 110 and the refrigerant line 102. The second heat exchanger 120 may additionally condense or evaporate the refrigerant that has passed through the first heat exchanger 110 through heat-exchange with the outside air.

That is, the second heat exchanger 120 condenses the refrigerant in the vehicle's cooling mode, and evaporates the refrigerant in the vehicle's heating mode. The second heat exchanger 120 may be an air-cooled heat exchanger disposed in front of the vehicle and heat-exchanges the refrigerant inflowed to the outside with the outside air.

As described, when the first heat exchanger 110 condenses the refrigerant, the second heat exchanger 120 further condenses the refrigerant condensed in the first heat exchanger 110, increasing subcooling of the refrigerant, and accordingly, a coefficient of performance (COP), which is a coefficient of cooling capacity compared to the required power of the compressor, may be improved.

In an exemplary embodiment of the present disclosure, the first expansion valve 160 is provided in the refrigerant line 102 connecting the second heat exchanger 120 and the evaporator 130. The first expansion valve 160 receives the refrigerant that has passed through the second heat exchanger 130 and expands the received refrigerant. Such a first expansion valve 160 may be a mechanical expansion valve.

The compressor 140 is connected between the evaporator 130 and the first heat exchanger 110 via the refrigerant line 102. Such a compressor 140 compresses a refrigerant in a gaseous state and supplies the compressed refrigerant to the internal condenser 150.

In an exemplary embodiment of the present disclosure, the accumulator 170 is provided in the refrigerant line 102 between the evaporator 130 and the compressor 150.

Such an accumulator 170 improves the efficiency and durability of the compressor 140 by supplying only the refrigerant in the gaseous state to the compressor 140.

Meanwhile, in an exemplary embodiment of the present disclosure, one end portion of the first branch line 104 may be connected to the refrigerant line 102 at a front end portion of the first heat exchanger 110 based on the flow direction of the refrigerant. The other end portion of the first branch line 104 may be connected to the refrigerant line 102 between the first heat exchanger 110 and the second heat exchanger 120.

Here, the first branch line 104 may be provided with a first refrigerant valve 103. The first refrigerant valve 103 may be selectively operated in the heating mode of the vehicle so that the refrigerant that has passed through the internal condenser 150 inflows to the first branch line 104.

The air conditioning device 100 with the above-described configuration may further include a second branch line 106 and a third branch line 108.

First, the second branch line 106 may connect the first heat exchanger 110 and the accumulator 170 through the second refrigerant valve 105 so that the refrigerant that has passed through the first heat exchanger 110 is selectively inflowed to the compressor 140 through the accumulator 170.

The second refrigerant valve 105 may be provided in the refrigerant line 101 between a rear end portion of the first heat exchanger 110 and the other end portion of the first branch line 104.

That is, the second refrigerant valve 105 may selectively open the second branch line 106 according to a vehicle's mode.

Here, the accumulator 170 may supply a gaseous refrigerant to the compressor 140 among the refrigerant supplied through the second branch line 106 opened through operation of the second refrigerant valve 105.

Furthermore, the third branch line 108 may selectively connect the second heat exchanger 120 and the accumulator 170 so that the refrigerant that has passed through the second heat exchanger 120 passes through the accumulator 170 and selectively inflows to the compressor 140.

One end portion of the third branch line 108 may be connected to the refrigerant line 102 between the second heat exchanger 120 and the first expansion valve 160. The other end portion of the third branch line 108 may be connected to the refrigerant line 102 between the evaporator 130 and the accumulator 170.

Here, the third branch line 108 may be provided with a third refrigerant valve 109.

The third refrigerant valve 109 may selectively open the third branch line 108 according to a vehicle's mode. That is, the third refrigerant valve 109 may close the third branch line 108 in the vehicle's cooling mode, and open the third branch line 108 in the vehicle's heating mode.

Meanwhile, in an exemplary embodiment of the present disclosure, the refrigerant line 102 may be provided with a second expansion valve 180 between the internal condenser 150 and the first branch line 104.

The second expansion valve 180 may selectively expand a refrigerant inflowed to the first heat-exchanger 110, and the first branch line 104 opened by the first refrigerant valve 103 in the vehicle's heating mode.

Here, the second expansion valve 180 may be an electronic expansion valve that selectively expands the refrigerant while controlling the flow of the refrigerant.

Furthermore, the first and third refrigerant valves 103 and 109 may be two-way valves, and the second refrigerant valve 105 may be a three-way valve configured for distributing flow.

The air conditioning device 100 may further include a third heat exchanger 190 provided in the refrigerant line 102 between the first expansion valve 160 and the third branch line 108.

The third heat exchanger 190 is connected to the refrigerant line 102 that connects the second heat exchanger 120 and the first expansion valve 160, and the refrigerant line 102 that connects the evaporator 130 and the accumulator 170, respectively.

In the third heat exchanger 190 may additionally condense the refrigerant condensed in the second heat exchanger 120 through heat-exchange with a refrigerant of a low temperature exhausted from the evaporator 130 and then may allow the additionally condensed refrigerant to flow to the first expansion valve 160. Such a third heat exchanger 190 may be a double tube heat exchanger.

In such a heat pump system, the first and second heat exchangers 110 and 120 may recover heat from the heat source while evaporating the refrigerant that has flowed inside in the vehicle's heating mode, respectively.

That is, the first heat exchanger 110 may recover the heat from the waste heat source of the heating element through heat-exchange of the coolant and the refrigerant circulating in the cooling apparatus 10 in the vehicle's heating mode. Furthermore, the second heat exchanger 120 may recover the heat from the outside thereof air heat source through heat-exchange of the outside air and the refrigerant.

Accordingly, the overall performance and heating efficiency of the heat pump system may be improved by use of the waste heat of the heating element recovered from the first and second heat exchangers 110 and 120, or the outside air heat source for indoor heating of the vehicle.

Hereinafter, the operation and function of the vehicle heat pump system according to the various exemplary embodiments of the present disclosure configured as described above will be described in detail with reference to FIG. 2.

First, the operation of the vehicle heat pump system according to the various exemplary embodiments of the present disclosure in the heating mode of the vehicle will be described with reference to FIG. 2.

Figure 2:
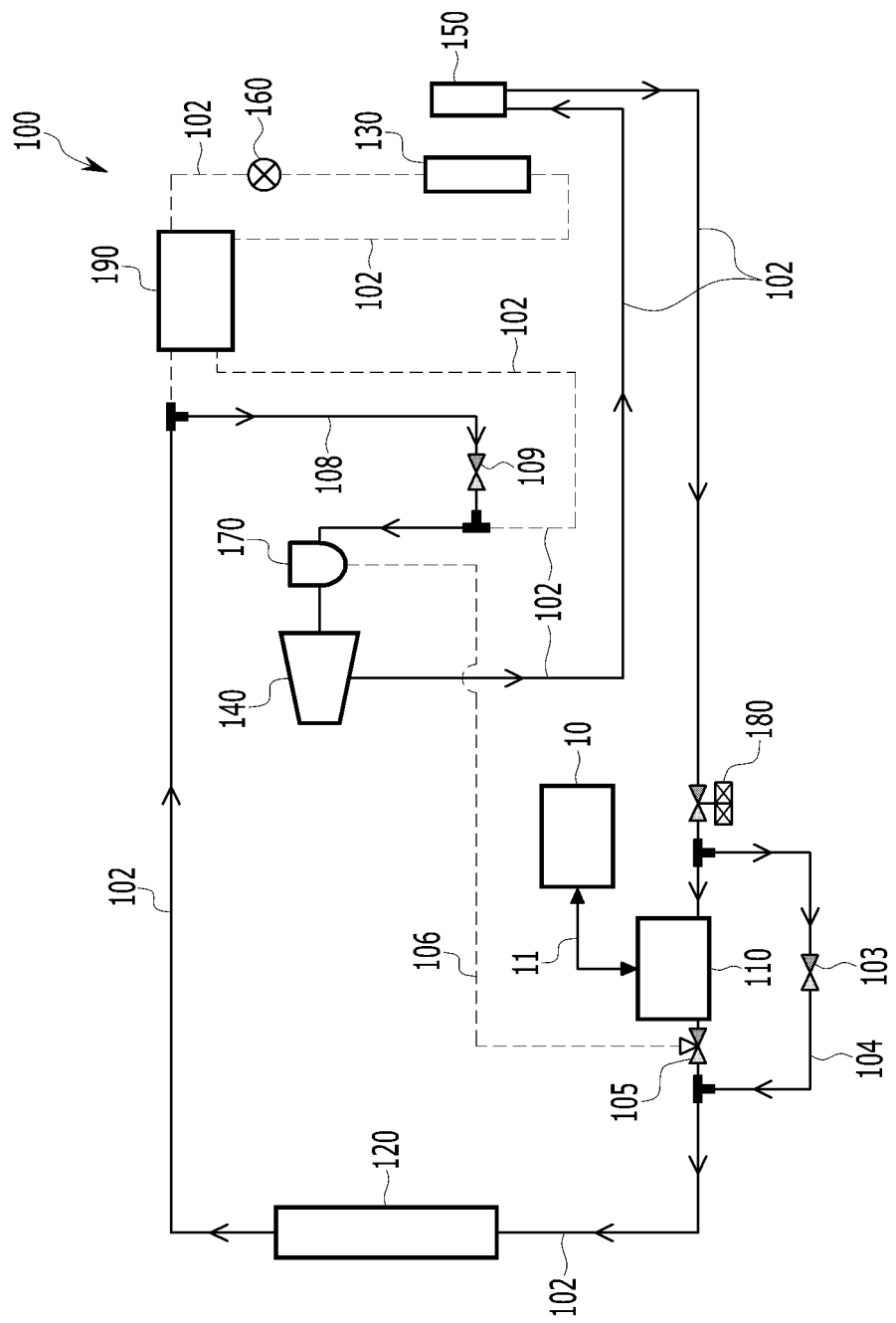
FIG. 2 is an operation state diagram for the heating mode of the vehicle in the vehicle heat pump system according to the various exemplary embodiments of the present disclosure.

FIG. 2 is an operation state diagram for the heating mode of the vehicle in the vehicle heat pump system according to the various exemplary embodiments of the present disclosure.

Referring to FIG. 2, when the vehicle is in the heating mode, the coolant circulates along the coolant line 11 opened by the operation of the water pump in the cooling apparatus 10.

Furthermore, each constituent element of the air conditioning device 100 operates to heat the vehicle interior so that the refrigerant circulates along the refrigerant line 102.

Here, the first branch line 104 is opened by the operation of the first refrigerant valve 103. The second branch line 106 is closed through operation of the second refrigerant valve 105.

Furthermore, the third branch line 108 is opened by the operation of the third refrigerant valve 109.

Furthermore, some of the refrigerant line 102 connected to the evaporator 130 may be closed through operation of the first expansion valve 160.

That is, the cooling apparatus 10 recovers waste heat of the heating element while cooling the heating element using the coolant. The heat from the coolant, of which temperature has risen while cooling the heating element, may be recovered through heat-exchange with the refrigerant in the first heat exchanger 110 without passing through the radiator.

Here, the refrigerant passed through the internal condenser 150 may be inflowed to the first and second heat exchangers 110 and 120 through the refrigerant line 102 and the opened first branch line 103 while being expanded through operation of the second expansion valve 180.

That is, among the refrigerant expanded while passing through the second expansion valve 180, some refrigerant inflows to the first heat exchanger 110 along the refrigerant line 102. Accordingly, the first heat exchanger 110 may evaporate the refrigerant using the coolant that flows along the coolant line 11 and has a temperature that has risen while recovering the waste heat of the heating element.

Furthermore, the remaining refrigerant of the refrigerant expanded while passing through the second expansion valve 180 may be inflowed to the second heat exchanger 120 along the opened first branch line 104 and the refrigerant line 102 connected therewith and the second heat exchanger 120.

In the instant case, the refrigerant that has passed through the first heat exchanger 110 may be inflowed into the second heat exchanger 120 together therewith.

Accordingly, the second heat exchanger 120 may recover the heat from the outside air heat source while evaporating the refrigerant inflowed through the heat-exchange with the outside air.

That is, the first heat exchanger 110 and the second heat exchanger 120 respectively evaporate the refrigerant that has flowed inside, and recover heat from each heat source and use it for heating of the interior of the vehicle.

Accordingly, the refrigerant that has passed through the second heat exchanger 120 is supplied to the accumulator 170 along the opened third branch line 108.

The refrigerant supplied to the accumulator 170 is separated into a gas and a liquid. The gaseous refrigerant of the refrigerant separated into a gas and a liquid is supplied to the compressor 140.

The refrigerant compressed from the compressor 140 at a high temperature and a high pressure is inflowed into the internal condenser 150.

Here, an opening/closing door is opened so that outside air inflowed to the HVAC module and passed through the evaporator 130 passes through the internal condenser 150.

Accordingly, when the outside air inflowed from the outside passes through the evaporator 130 which is not supplied with the refrigerant, the outside air is inflowed at the uncooled room temperature. The inflowed outdoor air passes through the internal condenser 150 and is converted to a high temperature state and inflows into the vehicle interior, heating the vehicle interior.

That is, the heat pump system according to the various exemplary embodiments of the present disclosure is used to simultaneously recover the heat from the waste heat source and the outside air heat source of the heating element from the first heat exchanger 110 and the second heat exchanger 120 to raise the temperature of the coolant/refrigerant so that the power consumption of the compressor 140 may be reduced and the heating efficiency may be improved.

Meanwhile, a vehicle heat pump system according to various exemplary embodiments of the present disclosure will be described with reference to FIG. 3.

Figure 3:
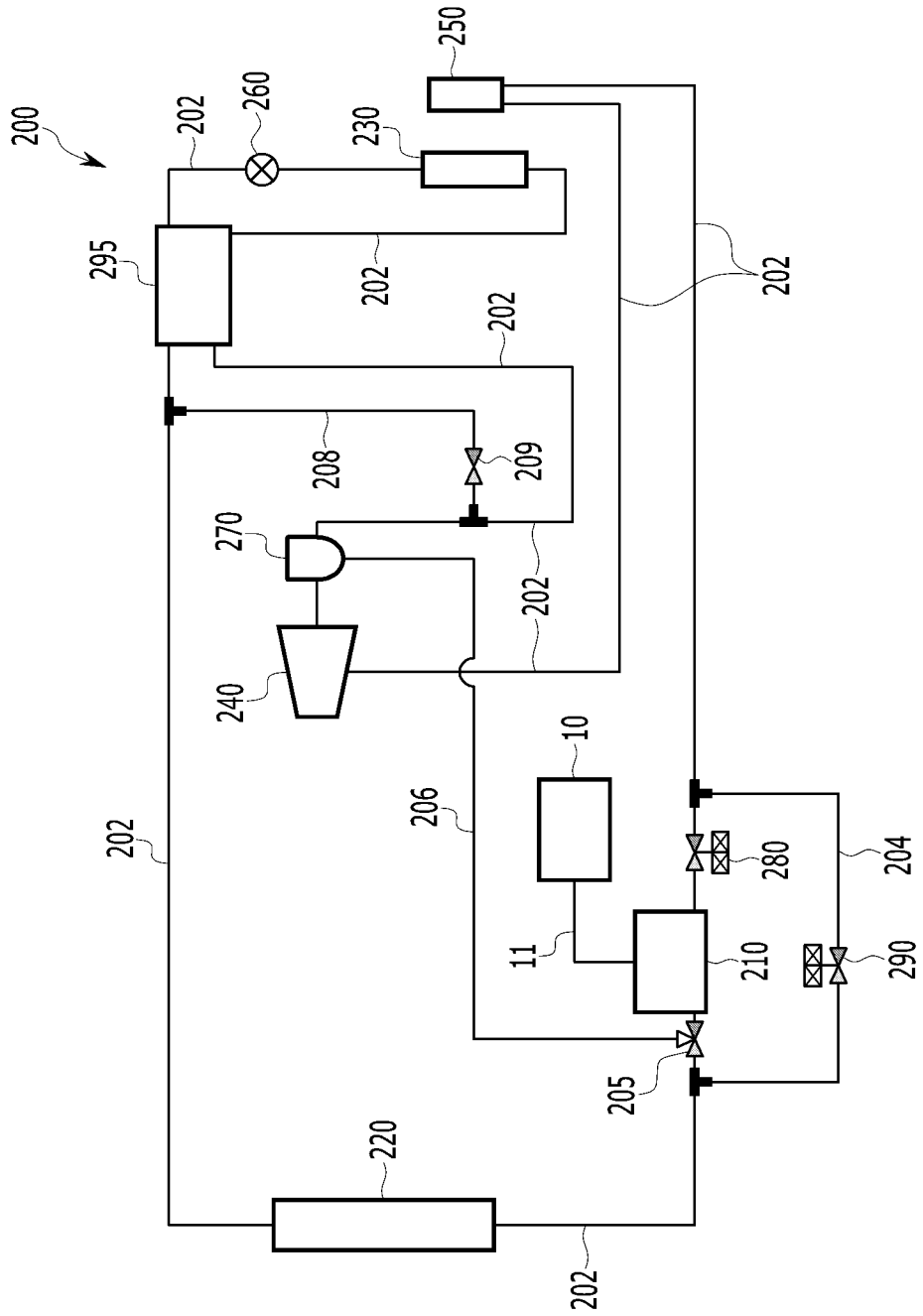
FIG. 3 is a block diagram of a vehicle heat pump system according to various exemplary embodiments of the present disclosure.

FIG. 3 is a block diagram of a vehicle heat pump system according to various exemplary embodiments of the present disclosure.

A vehicle heat pump system according to various exemplary embodiments of the present disclosure recovers and utilizes heat from a waste heat source of a heating element and an outside air heat source together from two heat exchangers that heat-exchange a refrigerant in a heating mode of a vehicle, improving heating efficiency.

Such a heat pump system may be applied to an electric vehicle.

Referring to FIG. 3, the heat pump system may include a cooling apparatus 10 and an air conditioning device 200.

The cooling apparatus 10 may include a radiator, a water pump, and a heating element, which are not illustrated in the drawing, connected through a coolant line 11.

The radiator is disposed at the front of the vehicle, and a cooling fan is disposed behind the radiator, so that the coolant is cooled through an operation of the cooling fan and heat exchange with the outside air.

Furthermore, the heating element may include an electric power control unit (EPCU), a motor, an inverter, an on-board charger (OBC), an autonomous driving controller, or a battery module, or an oil cooler connected to the motor.

Such a heating element is provided in the coolant line 11 and may be cooled by water cooling.

The cooling apparatus with the above-described configuration may circulate a coolant in the coolant line 11 through operation of the water pump so that the coolant is supplied to the heating element provided in the coolant line 11.

Accordingly, when waste heat of the heating element is recovered in the vehicle's heating mode, heat generated from the power control apparatus, motor, inverter, charger, battery module, or autonomous driving controller may be recovered.

In the FIG. 1 of the present disclosure, the air conditioning device 200 may circulate a refrigerant along a refrigerant line 202 to adjust an indoor temperature of the vehicle.

Such an air conditioning device 200 may include a first heat exchanger 210 and a second heat exchanger 220 connected through the refrigerant line 202.

The first and second heat exchangers 210 and 220 may be supplied with a refrigerant that has been separated into the refrigerant line 202 and a first branch line 204 and then expanded in a heating mode of the vehicle.

Here, the air conditioning device 200 may include a heating, ventilation, and air conditioning (HVAC) module, the first heat exchanger 210, the second heat exchanger 220, an evaporator 230, a compressor 240, an internal condenser 250, a first expansion valve 260, and an accumulator 270, which are connected through the refrigerant line 202.

The non-illustrated HVAC module is connected through the refrigerant line 202, and is provided with an opening/ closing door that controls outside air passing through the evaporator 230 to selectively inflow to the internal condenser 250 depending on a cooling mode, a heating mode, and a heating and dehumidification mode of the vehicle.

That is, the evaporator 230 and the internal condenser 250 may be provided inside the non-illustrated HVAC module.

Here, the opening/closing door is opened so that outside air that has passed through the evaporator 230 in the vehicle's heating mode inflows to the internal condenser 250. On the other hand, in the vehicle's cooling mode, the opening/closing door closes the internal condenser 250 side so that the cooled outside air flows directly into the vehicle while passing through the evaporator 230.

In an exemplary embodiment of the present disclosure, the first heat exchanger 210 is connected to the refrigerant line 202 and a refrigerant passes therethrough.

Here, the first heat exchanger 210 may be connected to the cooling apparatus 10 through the coolant line 11 to heat-exchange the refrigerant with a coolant.

According to a mode of the vehicle, the first heat exchanger 210 may condense or evaporate the refrigerant through heat-exchange with the coolant inflowed through the coolant line 11.

That is, the first heat exchanger 210 condenses the refrigerant in the vehicle's cooling mode and evaporates the refrigerant in the vehicle's heating mode. Such a first heat exchanger 210 may be a water-cooled heat exchanger in which a coolant is inflowed.

The second heat exchanger 220 is connected through the first heat exchanger 210 and the refrigerant line 202. The second heat exchanger 220 may additionally condense or evaporate the refrigerant that has passed through the first heat exchanger 210 through heat-exchange with the outside air.

That is, the second heat exchanger 220 condenses the refrigerant in the vehicle's cooling mode, and evaporates the refrigerant in the vehicle's heating mode. The second heat exchanger 220 may be an air-cooled heat exchanger disposed in front of the vehicle and heat-exchanges the refrigerant inflowed to the outside with the outside air.

As described, when the first heat exchanger 210 condenses the refrigerant, the second heat exchanger 220 further condenses the refrigerant condensed in the first heat exchanger 210, increasing the subcooling of the refrigerant, and accordingly, a coefficient of performance (COP), which is a coefficient of cooling capacity compared to the required power of the compressor, may be improved.

In the FIG. 3 of the present disclosure, the first expansion valve 260 is provided in the refrigerant line 202 connecting the second heat exchanger 220 and the evaporator 230. The first expansion valve 260 receives the refrigerant that has passed through the second heat exchanger 230 and expands the received refrigerant. Such a first expansion valve 260 may be a mechanical expansion valve.

The compressor 240 is connected between the evaporator 230 and the first heat exchanger 210 via the refrigerant line 202. Such a compressor 240 compresses a refrigerant in a gaseous state and supplies the compressed refrigerant to the internal condenser 250.

In the various exemplary embodiments of the present disclosure, the accumulator 270 is provided in the refrigerant line 202 between the evaporator 230 and the compressor 250.

Such an accumulator 270 improves the efficiency and durability of the compressor 240 by supplying only the refrigerant in the gaseous state to the compressor 240.

Meanwhile, in the various exemplary embodiments of the exemplary embodiment, one end portion of the first branch line 204 may be connected to the refrigerant line 202 at a front end portion of the first heat exchanger 210 based on the flow direction of the refrigerant. The other end portion of the first branch line 204 may be connected to the refrigerant line 202 between the first heat exchanger 210 and the second heat exchanger 220.

The air conditioning device 200 having such a configuration may further include a second branch line 206 and a third branch line 208.

First, the second branch line 206 may connect the first heat exchanger 210 and the accumulator 270 through the second refrigerant valve 205 so that the refrigerant that has passed through the first heat exchanger 210 is selectively inflowed to the compressor 240 through the accumulator 270.

The second refrigerant valve 205 may be provided in the refrigerant line 201 between a rear end portion of the first heat exchanger 210 and the other end portion of the first branch line 204.

That is, the second refrigerant valve 205 may selectively open the second branch line 206 according to a vehicle's mode.

Here, the accumulator 270 may supply a gaseous refrigerant to the compressor 240 among the refrigerant supplied through the second branch line 206 opened through operation of the second refrigerant valve 205.

Furthermore, the third branch line 208 may selectively connect the second heat exchanger 220 and the accumulator 270 so that the refrigerant that has passed through the second heat exchanger 220 passes through the accumulator 270 and selectively inflows to the compressor 240.

One end portion of the third branch line 208 may be connected to the refrigerant line 202 between the second heat exchanger 220 and the first expansion valve 260. The other end portion of the third branch line 208 may be connected to the refrigerant line 202 between the evaporator 230 and the accumulator 270.

Here, the third branch line 208 may be disposed with a third refrigerant valve 209.

The third refrigerant valve 209 may selectively open the third branch line 208 according to a vehicle's mode. That is, the third refrigerant valve 209 may close the third branch line 208 in the vehicle's cooling mode, and open the third branch line 208 in the vehicle's heating mode.

Meanwhile, in the various exemplary embodiments of the present disclosure, the refrigerant line 202 may be provided with a second expansion valve 280 between one end portion of the first branch line 204 and the first heat exchanger 210.

Such a second expansion valve 280 may selectively expand the refrigerant inflow from the internal condenser 250 to the first heat exchanger 210 through the refrigerant line 202 in the vehicle's heating mode.

Furthermore, the first branch line 204 may be disposed with a third expansion valve 290 in place of the first refrigerant valve provided in the above-described various exemplary embodiments of the present disclosure. The third expansion valve 290 is selectively operated in the vehicle's heating mode so that the refrigerant that has passed through the internal condenser 250 inflows to the first branch line 204.

The third expansion valve 290 opens the first branch line 204 so that the refrigerant that flows into the second heat exchanger 220 through the first branch line 204 is expanded, and simultaneously may expand the refrigerant that flows into the first branch line 204.

Here, the second and third expansion valves 280 and 290 may be electronic expansion valves that selectively expand a refrigerant while controlling the flow of the refrigerant.

Furthermore, the second refrigerant valve 205 may be a three-way valve configured for distributing flow, and the third refrigerant valve 209 may be a two-way valve.

The air conditioning device 200 may further include a third heat exchanger 290 provided in the refrigerant line 202 between the first expansion valve 260 and the third branch line 208.

The third heat exchanger 290 is connected to the refrigerant line 202 that connects the second heat exchanger 220 and the first expansion valve 260, and the refrigerant line 202 that connects the evaporator 230 and the accumulator 270, respectively.

In the third heat exchanger 290 may additionally condense the refrigerant condensed in the second heat exchanger 220 through heat-exchange with a refrigerant of a low temperature exhausted from the evaporator 230 and then may allow the additionally condensed refrigerant to flow to the first expansion valve 260. Such a third heat exchanger 290 may be a double tube heat exchanger.

In such a heat pump system, the first and second heat exchangers 210 and 220 may recover the heat from the heat source while evaporating the refrigerant that has flowed inside in the vehicle's heating mode, respectively.

That is, the first heat exchanger 210 may recover the heat from the waste heat source of the heating element through heat-exchange of the coolant and the refrigerant circulating in the cooling apparatus 10 in the vehicle's heating mode. Furthermore, the second heat exchanger 220 may recover the heat from the outside air heat source through heat-exchange of the outside air and the refrigerant.

Accordingly, the overall performance and heating efficiency of the heat pump system may be improved by use of the waste heat of the heating element recovered from the first and second heat exchangers 210 and 220, or the outside air heat source, for indoor heating of the vehicle.

Hereinafter, the operation of the vehicle heat pump system according to the various exemplary embodiments of the present disclosure configured as described above will be described in detail with reference to FIG. 4.

First, the operation of the vehicle heat pump system according to the various exemplary embodiments of the present disclosure in the heating mode of the vehicle will be described with reference to FIG. 4.

Figure 4:
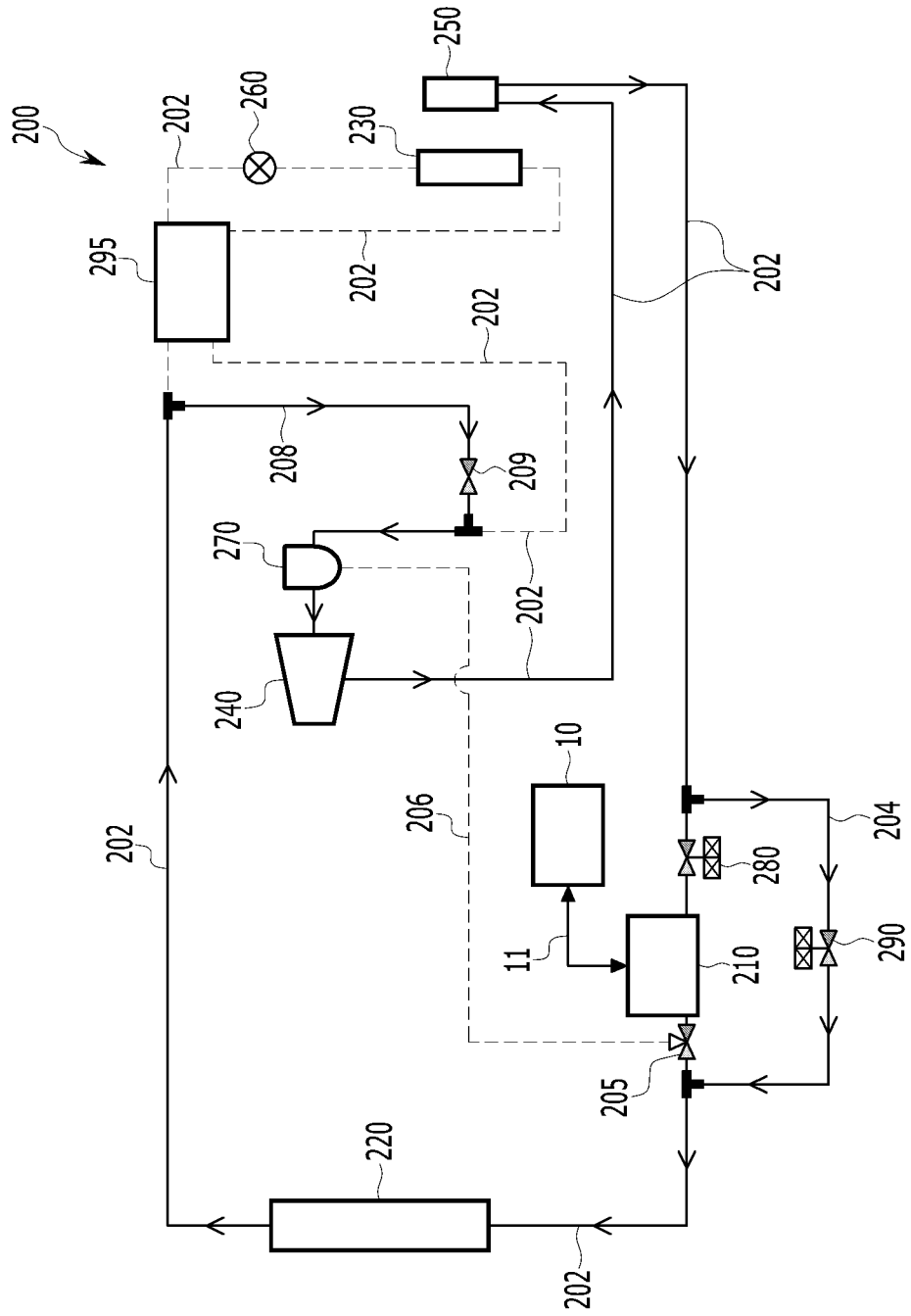
FIG. 4 is an operation state diagram for the heating mode of the vehicle in the vehicle heat pump system according to the various exemplary embodiments of the present disclosure.

FIG. 4 is an operation state diagram for the heating mode of the vehicle in the vehicle heat pump system according to the various exemplary embodiments of the present disclosure.

Referring to FIG. 4, when the vehicle is in the heating mode, the coolant circulates along the coolant line 11 opened by the operation of the water pump in the cooling apparatus 10.

Furthermore, each constituent element of the air conditioning device 200 operates to heat the vehicle interior so that the refrigerant circulates along the refrigerant line 202.

Here, the first branch line 204 is opened by the operation of the second expansion valve 290. The second branch line 106 is closed through operation of the second refrigerant valve 205.

Furthermore, the third branch line 208 is opened by the operation of the third refrigerant valve 209.

Furthermore, some of the refrigerant line 202 connected to the evaporator 230 may be closed through operation of the first expansion valve 260.

That is, the cooling apparatus 10 recovers waste heat of the heating element while cooling the heating element using the coolant. The coolant, of which temperature has risen while cooling the heating element, may be recovered through heat-exchange with the refrigerant in the first heat exchanger 210 without passing through the radiator.

Here, the refrigerant that has passed through the internal condenser 250 is separated into the refrigerant line 202 and the first branch line 204 opened through operation of the second expansion valve 280 and the third expansion valve 290, respectively.

After that, the refrigerant may be inflowed to the first and second heat exchangers 220 and 220 respectively in an expanded state through operation of the second expansion valve 280 and the third expansion valve 290, respectively.

That is, some of the refrigerant that has passed through the internal heat exchanger 250 is expanded while inflowing into the second expansion valve 280 along the refrigerant line 202. The expanded refrigerant inflows into the first heat exchanger 210 along the refrigerant line 202.

Accordingly, the first heat exchanger 210 flows along the coolant line 11, and may evaporate the refrigerant using the coolant of which temperature has risen while recovering the waste heat of the heating element.

Furthermore, the remaining refrigerant among the refrigerant that has passed through the internal heat exchanger 250 flows into the opened first branch line 204 and then expands while passing through the third expansion valve 290. The refrigerant expanded from the third expansion valve 290 may be inflowed to the second heat exchanger 220 along the refrigerant line 202 connected to the second heat exchanger 220.

In the instant case, the refrigerant that has passed through the first heat exchanger 210 may be inflowed into the second heat exchanger 220 together.

Accordingly, the second heat exchanger 220 may recover the heat from the outside air heat source while evaporating the refrigerant inflowed through the heat-exchange with the outside air.

That is, the first heat exchanger 210 and the second heat exchanger 220 respectively evaporate the refrigerant that has flowed inside, and recover heat from each heat source and use it for heating the interior of the vehicle.

Accordingly, the refrigerant that has passed through the second heat exchanger 220 is supplied to the accumulator 270 along the opened third branch line 208.

The refrigerant supplied to the accumulator 270 is separated into a gas and a liquid. The gaseous refrigerant of the refrigerant separated into the gas and the liquid is supplied to the compressor 240.

The refrigerant compressed from the compressor 240 at a high temperature and a high pressure is inflowed into the internal condenser 250.

Here, an opening/closing door is opened so that outside air inflowed to the HVAC module and passed through the evaporator 230 passes through the internal condenser 250.

Accordingly, when the outside air inflowed from the outside passes through the evaporator 230 which is not supplied with the refrigerant, the outside air is inflowed at the uncooled room temperature. The inflowed outdoor air passes through the internal condenser 250 and is converted to a high temperature state and inflows into the vehicle interior, thereby heating the vehicle interior.

That is, the heat pump system according to the various exemplary embodiments of the present disclosure is used to simultaneously recover the heat from the waste heat source and the outside air heat source of the heating element from the first heat exchanger 210 and the second heat exchanger 220 to raise the temperature of the coolant/refrigerant so that the power consumption of the compressor 240 may be reduced and the heating efficiency may be improved.

Therefore, when the vehicle heat pump systems according to the exemplary embodiments of the present disclosure in FIGS. 1 and 3 are applied as described above, heat from each heat source from the first heat exchangers 110 and 210 and the second heat exchangers 120 and 220 that heat-exchange the refrigerant in the vehicle's heating mode is recovered together and used, and thus the amount of heat absorbed may be increased, improving heating efficiency.

Furthermore, according to an exemplary embodiment of the present disclosure, the cooling apparatus 10 and the air conditioning devices 100 and 200 are interlocked by applying the first heat exchangers 110 and 210 in which the coolant and refrigerant are heat-exchanged and the second heat exchangers 120 and 220 in which the outside air and refrigerant are heat-exchanged, and thus the refrigerant is selectively condensed or evaporated, improving performance, and promoting simplification of the entire system.

Furthermore, through the simplification of the entire system, it is possible to reduce manufacturing cost and weight, and improve space utilization.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A heat pump system for a vehicle, the heat pump system comprising:
   a cooling apparatus that includes a coolant line, and circulates a coolant in the coolant line; and
   an air conditioning device that circulates a refrigerant along a refrigerant line to control an indoor temperature of the vehicle,
   wherein the air conditioning device includes first and second heat exchangers connected through the refrigerant line,
   wherein in a heating mode of the vehicle, the first heat exchanger and the second heat exchanger are supplied with a refrigerant separated into the refrigerant line and a first branch line after being expanded, or a refrigerant expanded after being separated into the refrigerant line and the first branch line,
   wherein a first end portion of the first branch line is connected to the refrigerant line at a front end portion of the first heat exchanger based on a flow direction of the refrigerant, and
   wherein a second end portion of the first branch line is connected to the refrigerant line between the first heat exchanger and the second heat exchanger,
   wherein the first branch line is provided with a first refrigerant valve,
   wherein the air conditioning device includes:

an evaporator which is connected to the second heat exchanger through the refrigerant line;

a compressor which is connected to the evaporator through the refrigerant line;

an internal condenser which is connected to the compressor through the refrigerant line;

a first expansion valve which is provided in the refrigerant line between the second heat exchanger and the evaporator;

a second branch line that selectively connects the first heat exchanger and an accumulator through a second refrigerant valve for selective inflow of a refrigerant passed through the first heat exchanger to the compressor after passing through the accumulator; and a third branch line that selectively connects the second heat exchanger and the accumulator for selective inflow of the refrigerant that has passed through the second heat exchanger to the compressor after passing through the accumulator, wherein a first end portion of the third branch line is connected to the refrigerant line between the second heat exchanger and the first expansion valve, wherein a second end portion of the third branch line is connected to the refrigerant line between the evaporator and the accumulator, wherein the first heat exchanger is connected to the cooling apparatus through the coolant line for heat-exchange of the refrigerant with a coolant, and wherein the second heat exchanger is an air-cooled heat exchanger that condenses or evaporates the refrigerant through heat-exchange with outside air.

2. The heat pump system for the vehicle of claim 1, wherein the second refrigerant valve is provided in the refrigerant line between a rear end portion of the first heat exchanger and the second end portion of the first branch line.

3. The heat pump system for the vehicle of claim 1, wherein the third branch line is provided with a third refrigerant valve.

4. The heat pump system for the vehicle of claim 1, wherein the refrigerant line is provided with a second expansion valve between the internal condenser and the first branch line.

5. The heat pump system for the vehicle of claim 4, wherein
when the vehicle is in the heating mode,
the first branch line and the third branch line are opened,
the second branch line is closed by operation of the second refrigerant valve,
a portion of the refrigerant line connected to the evaporator is closed by operation of the first expansion valve, and
a refrigerant passed through the internal condenser is inflowed to the first heat exchanger and the second heat exchanger respectively through the refrigerant line and the opened first branch line while being expanded by operation of the second expansion valve.

6. The heat pump system for the vehicle of claim 5, wherein the first heat exchanger and the second heat exchanger recover heat from a heat source while evaporating the inflowed refrigerant.

7. The heat pump system for the vehicle of claim 1, wherein the refrigerant line is provided with a second expansion valve between the first end portion of the first branch line and the first heat exchanger.

8. The heat pump system for the vehicle of claim 7, wherein the first branch line is provided with a third expansion valve.

9. The heat pump system for the vehicle of claim 8, wherein
when the vehicle is in the heating mode,
the first branch line and the third branch line are opened,
the second branch line is closed by operation of the second refrigerant valve,
a portion of the refrigerant line, connected to the evaporator, is closed by operation of the first expansion valve,
a part of the refrigerant passed through the internal condenser is inflowed to the first heat exchanger while being expanded while passing through the second expansion valve along the refrigerant line, and
a remaining refrigerant among the refrigerant passed through the internal condenser is inflowed to the second heat exchanger while being expanded while passing through the third expansion valve along the first branch line.

10. The heat pump system for the vehicle of claim 9, wherein the first heat exchanger and the second heat exchanger recover heat from a heat source while evaporating the inflowed refrigerant, respectively.

11. The heat pump system for the vehicle of claim 1, wherein the air conditioning device further includes a third heat exchanger provided in the refrigerant line between the first expansion valve and the third branch line.

12. The heat pump system for the vehicle of claim 11, wherein the third heat exchanger is connected to the refrigerant line that connects the second heat exchanger and the first expansion valve, and the refrigerant line that connects the evaporator and the accumulator.

13. The heat pump system for the vehicle of claim 11, wherein the third heat exchanger is a double tube heat exchanger.

14. The heat pump system for the vehicle of claim 1, wherein the first heat exchanger is a water-cooled heat exchanger that condenses or evaporates the refrigerant through heat-exchange with the coolant inflowed through the coolant line.

* * * * *